7819X
C. H. McCORMICK.
Plow.
Patented Nov. 19, 1833.
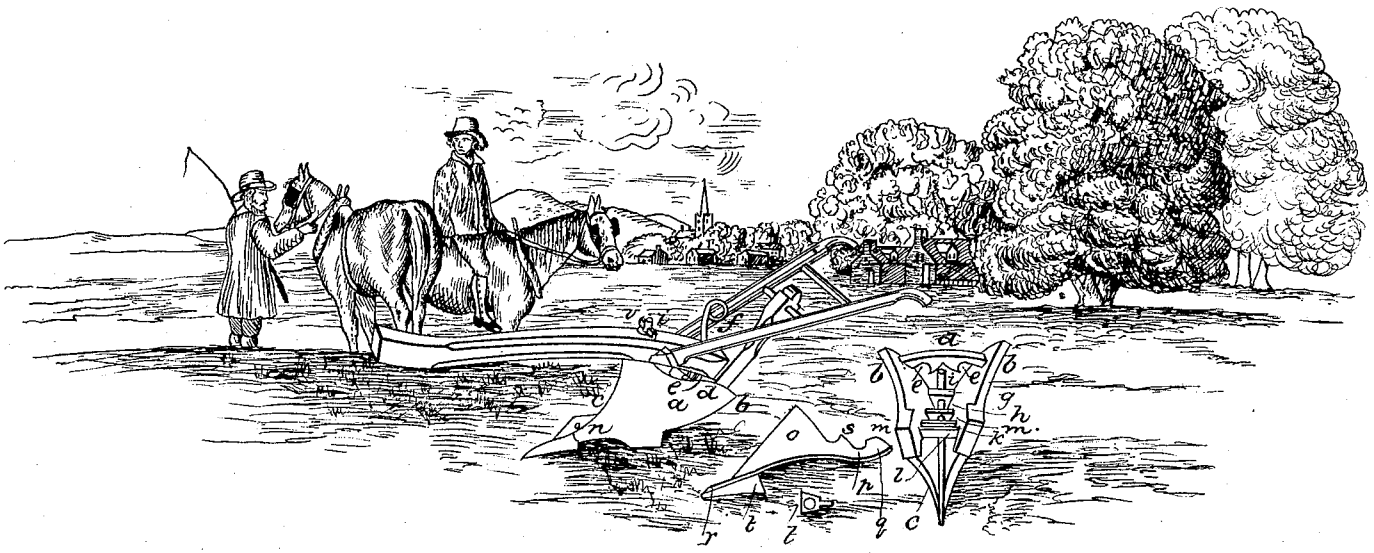
N. PETERS, Photo-Lithographer, Washington, D. C.

7819X

UNITED STATES PATENT OFFICE.

CYRUS H. McCORMICK, OF ROCKBRIDGE COUNTY, VIRGINIA.

SELF-SHARPENING PLOW.

Specification forming part of Letters Patent dated November 19, 1833.

*To all whom it may concern:*

Be it known that I, CYRUS H. McCORMICK, of Rockbridge county and State of Virginia, have made an Improvement in the Useful Arts, being a Self-Sharpening Horizontal Plow, which is described as follows.

This plow, like most others, consists of a beam, handles, helve, mold-board, and share. In addition to these, there is a latch-rod to make fast the mold-board and share when changed to either side, and a main bolt to support the mold-board.

The beam, handles, and helves are similar to those employed in other plows.

The mold-board (represented at *a* in the annexed drawing) is made double, of cast-iron, curved somewhat like other mold-boards on both sides. The wings *b b* are united in front at *c*, and extend outward, making a suitable angle for turning over the earth. There is a brace, *d*, extending between the two wings behind, supporting them firmly, with the projections *e e* on one side for receiving the latch-rod *f* when changing the plow. Between the wings, on the top and near the front, is a brace, *g*, and another, *h*, near the middle, through which there are openings for the main bolt *i* to pass. Near the bottom of the mold-board are two other braces, *k l*, at about one inch apart, for receiving the hinder end of the share, and between which it plays and turns. Near the ends of these braces, and upon the lower side of the mold-board, are two projections, *m m*, upon which the mold-board slides alternately. These projections can either be cast solid with the mold-board or be made of steel or cast iron and be riveted on. These projections serve also to hold and support the share when turned. At the front end of the mold-board is cast on it a projection, *n*, which serves as a pivot, upon which the share turns.

The share *o* is made of cast or wrought iron, in a triangular shape. It consists of the neck *p* (with or without a head) and a slot, *q*, for a key-place behind the braces, also a point, *r*, either cast on the share or made separately and fastened on it by being riveted or otherwise. There is also a shoulder or projection, *s*, by means of which and the latch-rod the share is kept in its place when changed. In the hinder end of the point is a cavity, *t*, to admit the point on the mold-board, upon which and the neck the share turns.

The main bolt *i* is made of wrought-iron, and passes through the beam and the two openings in the braces of the mold-board before mentioned, having a head, *w*, on the lower end, and either a screw or key, *v*, on the head above the beam.

The latch-rod *f* is a plain curved rod of wrought-iron, which extends from above the beam to the neck of the share, and is movable from one side of the beam and mold-board to the other, passing between the beam and the projections on the brace of the mold-board, and entering between the neck of the share and the wing of the mold-board, and by which the mold-board and share are secured in the position required.

Operation: When required to plow on a hillside—say the declination of the hill is on the right—the right wing of the mold-board and share must stand out from the bed *m* to the right, and the other wing of the mold-board, being nearly parallel with the beam, forms the landside, the latch-rod being put in its proper place. One furrow being made in this position, the latch-rod is taken out, and turning the plow resting on the share, the share is turned on the point of the mold-board to the other side, or left, and the mold-board also changes sides, the left wing projecting out to the left, the right wing forming the landside. The latch-rod is passed between the other side of the beam and the other projection on the brace, the point entering again between the neck of the share and the other wing of the mold-board, which, pressing the shoulder on the share above that on the mold-board, makes it fast.

The neck of the share might be made to turn on a pivot or collar on the center, instead of the opening between the braces. A nail or pin is driven in the helve below the brace to prevent the mold-board from sinking behind or the beam from rising, to steady the plow.

The invention here claimed, and desired to be secured by Letters Patent, consists in—

The peculiar arrangement of the several parts of the plow, as before described, and particularly the mode of forming the point at the end of the mold-board on which the share turns, and the two braces with the space between, in which the neck of the share works, the brace near the center of the mold-board, the two projections on which the mold-board slides, and the share, with the mode of turning and fastening it by the latch-rod.

Done at the city of Washington this 29th day of October, 1833.

CYRUS H. McCORMICK.

Witnesses:

WM. P. ELLIOT,

SAML. P. WALKER, Jr.